(12) United States Patent
Chiang et al.

(10) Patent No.: US 8,761,807 B2
(45) Date of Patent: Jun. 24, 2014

(54) COMPUTING USER DEVICE LOCATIONS IN LOCATION SERVICE DEAD ZONES

(75) Inventors: David Chiang, Fremont, CA (US);
Patricia R. Chang, San Ramon, CA (US); Arda Aksu, Martinez, CA (US);
Lalit R. Kotecha, San Ramon, CA (US);
Deepak Kakadia, Union City, CA (US);
Priscilla Lau, Fremont, CA (US)

(73) Assignees: Cellco Partnership, Basking Ridge, NJ (US); Verizon Patent and Licensing Inc., Basking Ridge, NJ (US)

( * ) Notice: Subject to any disclaimer, the term of this patent is extended or adjusted under 35 U.S.C. 154(b) by 4 days.

(21) Appl. No.: 13/617,028

(22) Filed: Sep. 14, 2012

(65) Prior Publication Data
US 2014/0080502 A1  Mar. 20, 2014

(51) Int. Cl.
*H04W 24/00* (2009.01)

(52) U.S. Cl.
USPC ............... 455/456.5; 455/456.1; 455/550.1; 701/33.2

(58) Field of Classification Search
USPC ......... 455/456.5, 456.1, 550.1; 701/211, 33.2
See application file for complete search history.

(56) References Cited

U.S. PATENT DOCUMENTS

| | | | |
|---|---|---|---|
| 6,597,906 B1 * | 7/2003 | Van Leeuwen et al. ... | 455/422.1 |
| 6,721,572 B1 * | 4/2004 | Smith et al. ................ | 455/456.1 |
| 2008/0154499 A1 * | 6/2008 | Tanaka ......................... | 701/211 |
| 2011/0201350 A1 * | 8/2011 | Das et al. .................... | 455/456.1 |
| 2013/0122902 A1 * | 5/2013 | Ren .............................. | 455/434 |
| 2013/0137453 A1 * | 5/2013 | Ando ........................... | 455/456.1 |

* cited by examiner

*Primary Examiner* — Danh Le (57) ABSTRACT

A system may be configured to receive first information regarding a location service dead zone; receive second information regarding a location of a user device; identify, based on the first information and the second information, that the user device is within the location service dead zone at a particular time; compute a location of the user device, within the location service dead zone, at the particular time, based on at least one of the second information regarding the location of the user device, history data associated with the user device, or history data associated with one or more other user devices; and store or output information regarding the computed location of the user device at the particular time.

18 Claims, 10 Drawing Sheets

COMPUTING USER DEVICE LOCATIONS IN LOCATION SERVICE DEAD ZONES

BACKGROUND

User devices, such as cellular telephones, often invoke applications (e.g., map applications, navigation applications, etc.) that benefit from receiving accurate information regarding the location of the user devices. Some user devices may include software and/or hardware that is capable of determining user device location. Some user devices (e.g., user devices with assisted global positioning system ("aGPS") functionality) may additionally, or alternatively, use location data received from an external source, such as from a cellular service provider (obtained via triangulation and/or one or more other techniques), in order to determine user device location.

DETAILED DESCRIPTION OF PREFERRED EMBODIMENTS

The following detailed description refers to the accompanying drawings. The same reference numbers in different drawings may identify the same or similar elements.

Existing systems often include functionality for determining (or approximately determining) a location of a user device. Such systems may include, for example, a cellular telephone system, which may determine a location of a user device using cellular tower triangulation and/or one or more other techniques. In some situations, a user device may enter an area (referred to hereinafter as a "location service dead zone") in which these techniques (e.g., cellular tower triangulation and/or one or more other techniques) are imprecise, inaccurate, and/or unavailable. Such location service dead zones may include, for instance, topographical features (e.g., mountainous terrain, forests, etc.), human-made structures (e.g., buildings, parking garages, tunnels, etc.), distributed antennas systems ("DASs"), and/or one or more other phenomena that hinder or prevent determining a location of a user device using, for example, cellular tower triangulation.

A system and/or method, described herein, may be capable of computing (e.g., approximately determining and/or predicting) a location of a user device when the user device is in a location service dead zone. In some implementations, the system may store information identifying one or more location service dead zones. As described herein, the system of some implementations may automatically identify one or more location service dead zones based on activity of one or more user devices. Additionally, or alternatively, the system of some implementations may receive such information from one or more sources (e.g., a database that stores information regarding location service dead zones, via manual input from a user, etc.). As also described herein, the system of some implementations may detect that the user device has entered a location service dead zone based on, for example, a location of the user device and/or a velocity of the user device. As further described herein, the system of some implementations may compute, at a given time while the user device is located in a location service dead zone, a location (e.g., a probable and/or approximate location) of the user device.

By computing a location of a user device while the user device is in a location service dead zone, the system of some implementations may provide functionality that was not previously available (e.g., computing a location of a user device in an area where the location was not previously able to be accurately determined). Thus, user devices and/or networks may more thoroughly be able to use and/or provide location-based services to users, thus enhancing users' experiences.

Figure 1A:
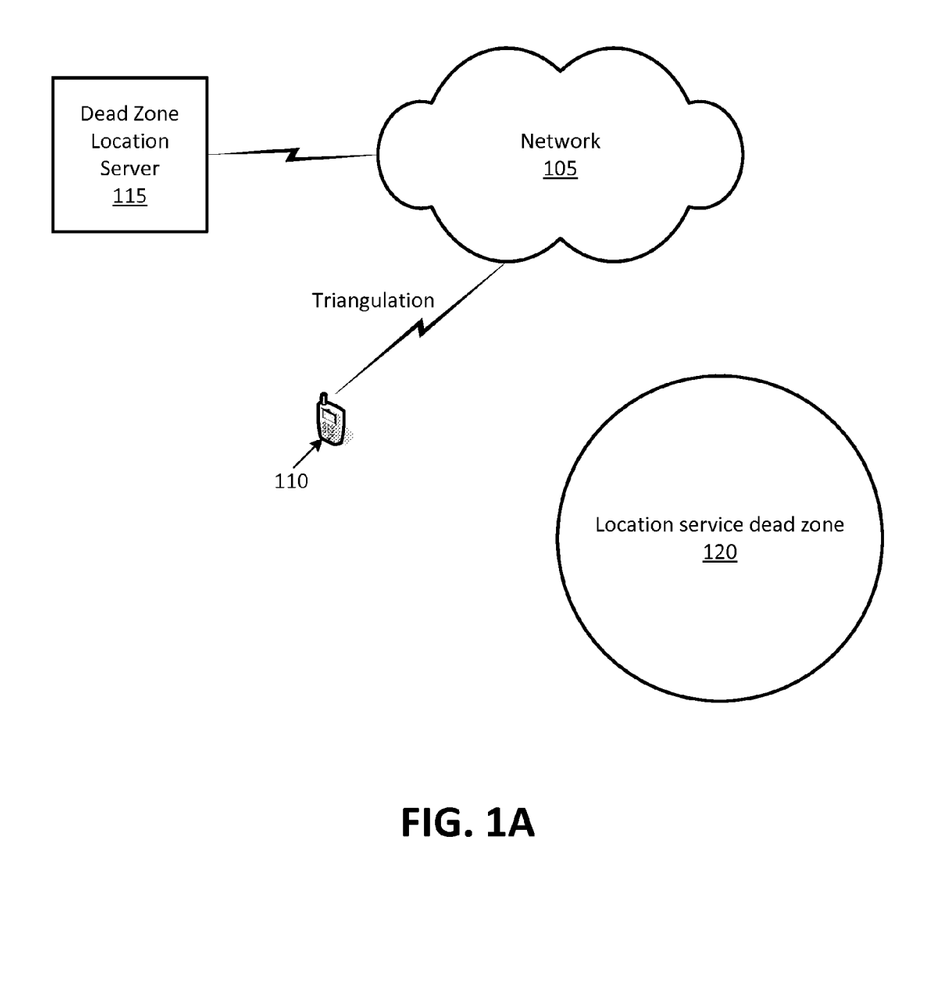
FIGS. 1A-C illustrate an overview of one or more example implementations described herein.
Figure 1B:
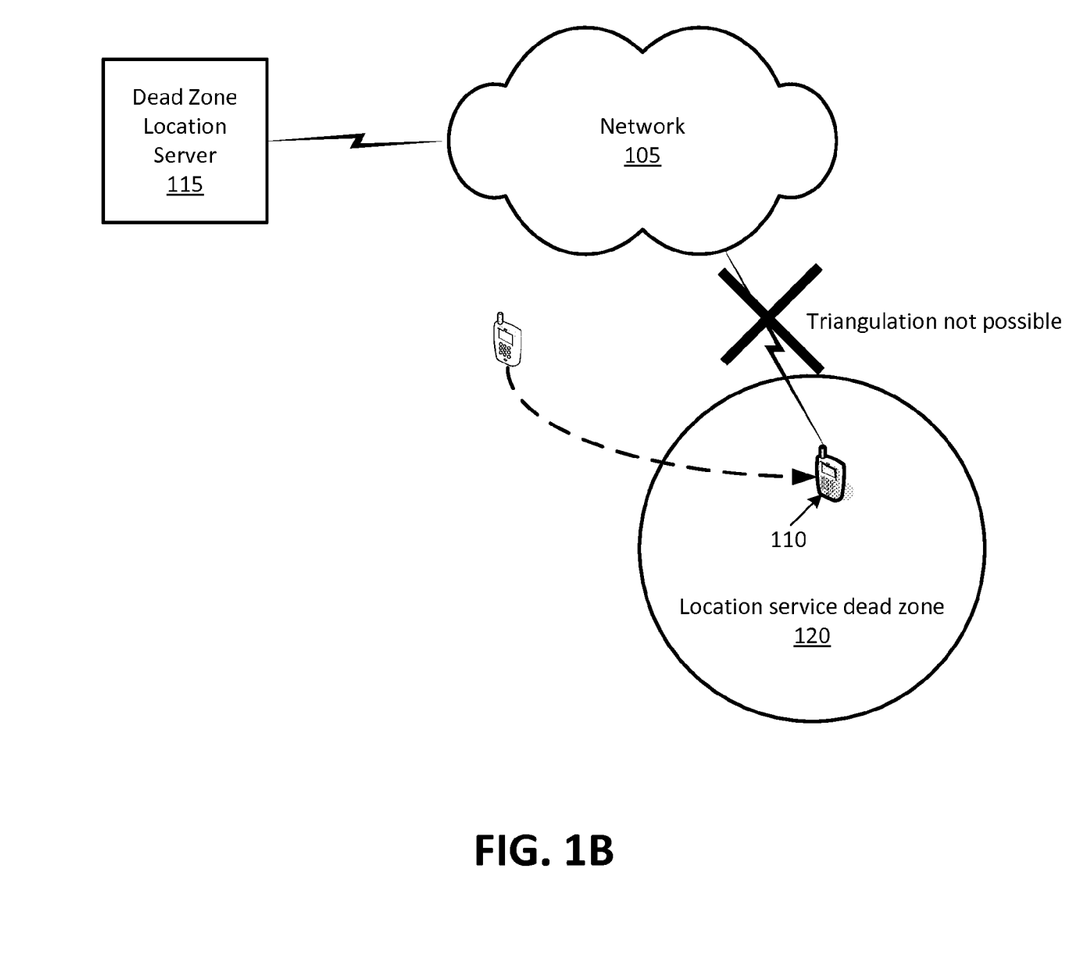
Figure 1C:
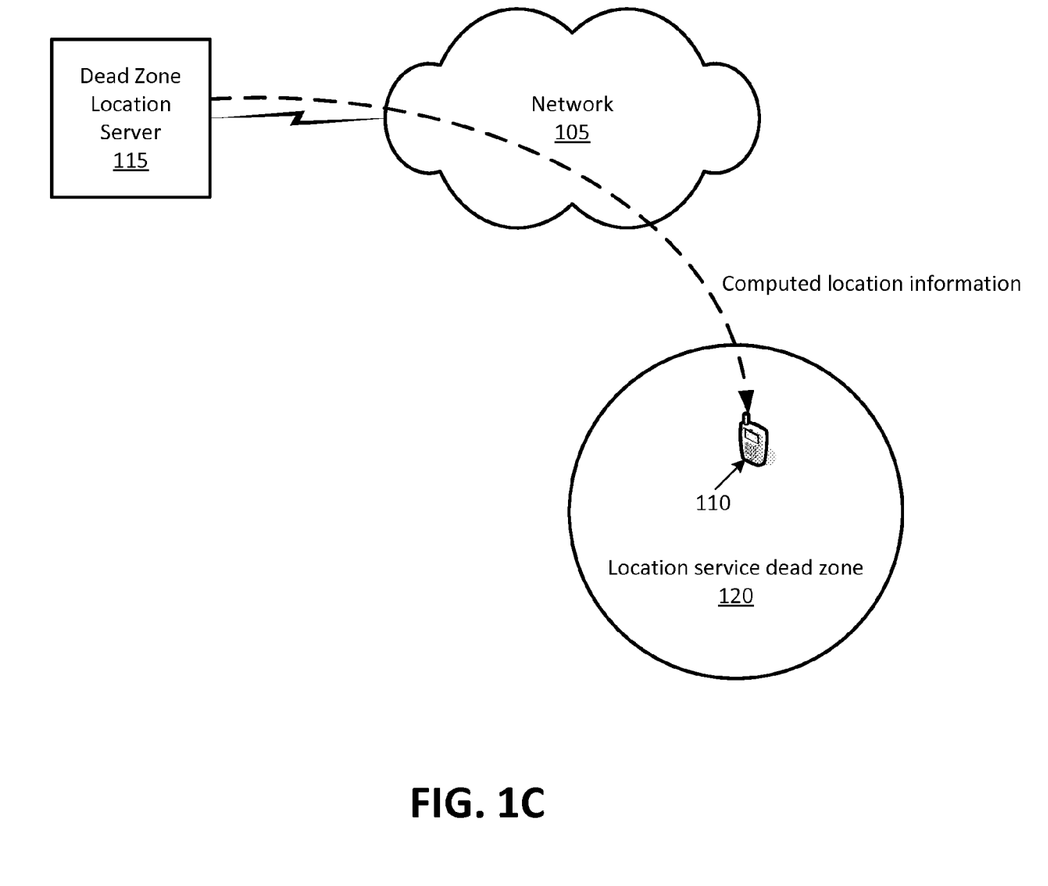

FIGS. 1A-C illustrate an overview of one or more example implementations described herein. As shown in FIG. 1A, network 105 may be in communication with user device 110, and may include and/or be in communication with dead zone location server 115. Network 105 may include, for instance, a cellular network, which may be capable of determining a location of user device 110 via, for instance, cellular tower triangulation. Dead zone location server 115 may store, for example, information identifying location service dead zone 120. In the example shown in FIG. 1A, user device 110 may be outside of location service dead zone 120. Therefore, network 105 may be able to determine a location of user device 110 via, for example, triangulation.

In the example shown in FIG. 1B, user device 110 may have moved to a location within location service dead zone 120. As shown, when user device 110 is in location service dead zone 120, network 105 may be unable to perform triangulation (and/or the triangulation may be inaccurate and/or imprecise). When user device 105 is in location service dead zone 120, and as shown in FIG. 1C, dead zone location server 115 may compute a location (e.g., a probable location), associated with user device 110 within location service dead zone 120. As described below, dead zone location server 115 may compute this location based on one or more factors, such as attributes associated with location service dead zone 120, trends associated with interactions between location service dead zone 120 and user device 110 and/or other user devices, a pattern of movement of user device 110 prior to entering location service dead zone 120, and/or one or more other factors. In some implementations, and as shown in FIG. 1C, dead zone location server 115 may output this computed location information to user device 110, which may, for example, use the information as location assistance information for an assisted location determination technique, such as an aGPS technique. Additionally, or alternatively, dead zone location server 115 may output this computed location information to one or more components of network 105 and/or one or more other devices (e.g., a "911" emergency location determination device).

Figure 2:
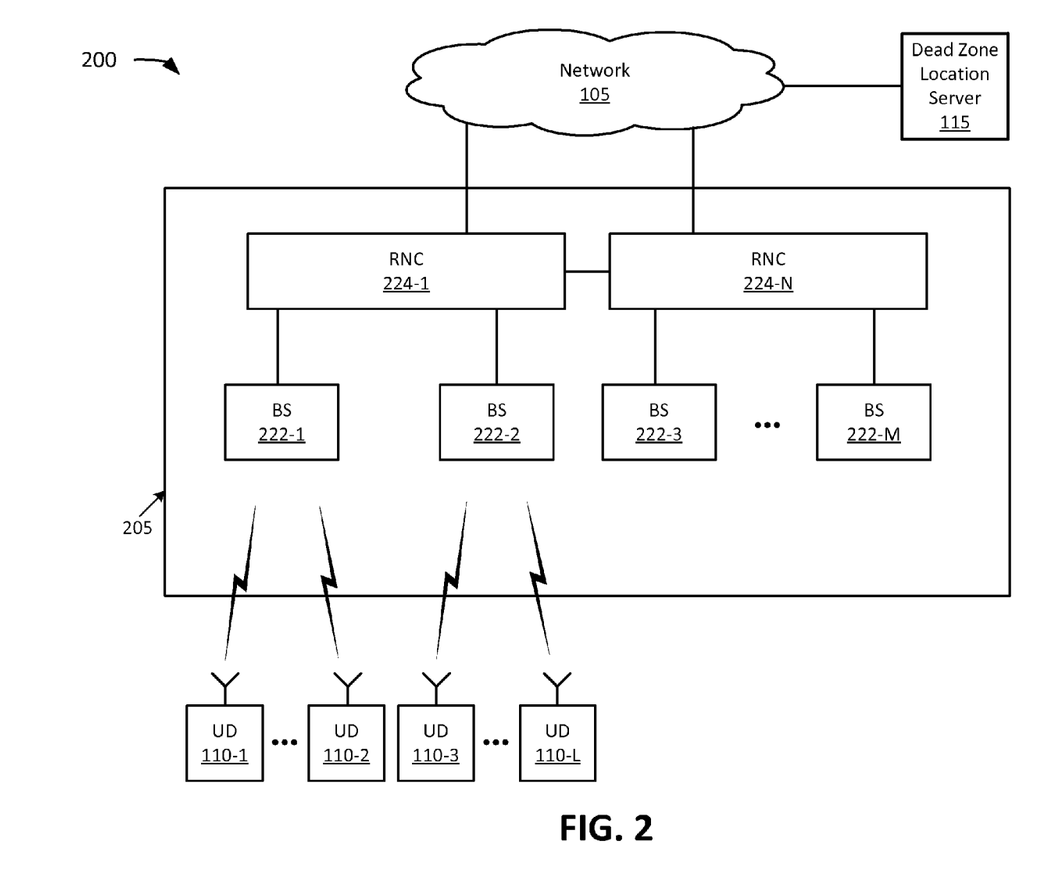
FIG. 2 illustrates an example network in which systems and/or methods, described herein, may be implemented.

FIG. 2 depicts a diagram of an example system 200 in which systems and/or methods described herein may be implemented. As shown, system 200 may include a group of user devices 110-1 through 110-L (where L is an integer that is greater than or equal to 1) (referred to collectively as "user devices 110," and in some instances individually, as "user device 110"), radio access network ("RAN") 205, network 105, and dead zone location server 115. Four user devices 110, a single RAN 205, a single network 105, and a single dead zone location server 115 have been illustrated in FIG. 2 for simplicity. In practice, additional user devices 110, RANs 205, networks 105, and/or dead zone location servers 115 may be used. Also, in some instances, a component in system 200 (e.g., one or more of user device 110, RAN 205, network 105, and/or dead zone location server 115) may perform one or more functions described as being performed by another component or group of components in system 200.

User device 110 may include one or more devices capable of sending/receiving voice and/or data to/from RAN 205. User device 110 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, or the like.

RAN 205 may include one or more devices for transmitting voice and/or data to user device 110 and network 105. As illustrated in FIG. 2, RAN 205 may include a group of base stations ("BSs") 222-1 through 222-M (where M is an integer that is greater than or equal to 1) (referred to collectively as "base stations 222" and in some instances, individually as "base station 222"), and a group of radio network controllers ("RNCs") 224-1 through 224-N (where N is an integer that is greater than or equal to 1) (referred to collectively as "radio network controllers 224" and in some instances, individually as "radio network controller 224"). Four base stations 222 and two RNCs 224 are shown in FIG. 2 for simplicity. In practice, there may be additional or fewer base stations 222 and/or RNCs 224. Also, in some instances, a component in RAN 205 (e.g., one or more of base stations 222 and RNCs 224) may perform one or more functions described as being performed by another component or group of components in RAN 205. In some implementations, RAN 205 may correspond to a Long Term Evolution ("LTE") RAN. In such an example, base stations 222 may take the form of evolved node Bs ("eNBs"), and RNCs 224 may take the form of mobile management entities ("MMEs").

Base stations 222 may include one or more network devices that receive voice and/or data from RNCs 224 and transmit the voice and/or data to/from user devices 110 via an air interface (e.g., via one or more wireless transceivers associated with base stations 222). Base stations 222 may also include one or more network devices that receive voice and/or data from user devices 110 over an air interface and transmit the voice and/or data to RNCs 224 or other user devices 110. One or more components of network 105 may determine a location of a particular user device 110 based on triangulation, using information from multiple base stations 222.

RNCs 224 may include one or more devices that control and manage base stations 222. Radio network controllers 224 may also include devices that perform data processing to manage utilization of radio network services. RNCs 224 may transmit/receive voice and data to/from base stations 222, other radio network controllers 224, and/or network 105.

RNC 224 may act as a controlling radio network controller ("CRNC"), a drift radio network controller ("DRNC"), and/or a serving radio network controller ("SRNC"). A CRNC may be responsible for controlling the resources of a base station 222. A SRNC may serve particular user device 110 and may manage connections towards that user device 110. A DRNC may fulfill a similar role to the SRNC (e.g., may route traffic between a SRNC and user device 110).

Network 105 may include one or more devices that transfer/receive voice and/or data to a circuit-switched and/or packet-switched network. In some implementations, network 210 may include, for example, a mobile switching center ("MSC"), a gateway MSC ("GMSC"), a media gateway ("MGW"), a serving general packet radio service ("GPRS") support node ("SGSN"), a gateway GPRS support node ("GGSN"), a Call Session Control Function ("CSCF"), components of an IP-based network, and/or other devices.

Dead zone location server 115 may include one or more server devices that may compute a location of a user device (e.g., user device 110) when the user device is in a location service dead zone. Dead zone location server 115 may provide information regarding the computed location to the user device, which may use the information for a location-based application, such as a navigation application, a map application, or the like. Additionally, or alternatively, dead zone location server 115 may provide the information regarding the computed location to one or more other devices, such as a position determining entity ("PDE"), one or more devices associated with a "911" emergency service, and/or any other device.

Figure 3:
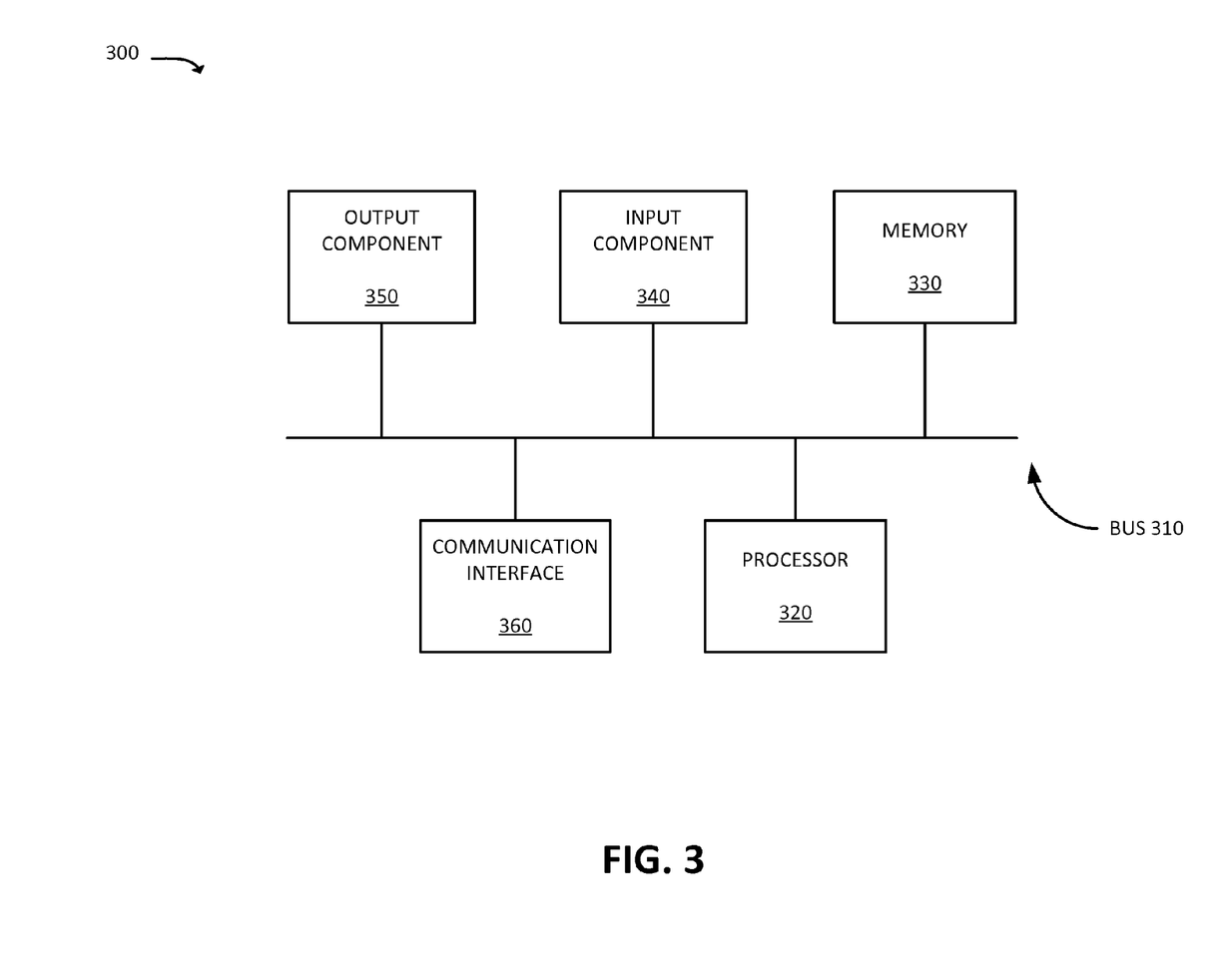
FIG. 3 illustrates example components of one or more devices shown in FIG. 2.

FIG. 3 is a diagram of example components of device 300. Each of the devices illustrated in FIG. 1 or 2 may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to computing a location of a user device while the user device is in a location service dead zone. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
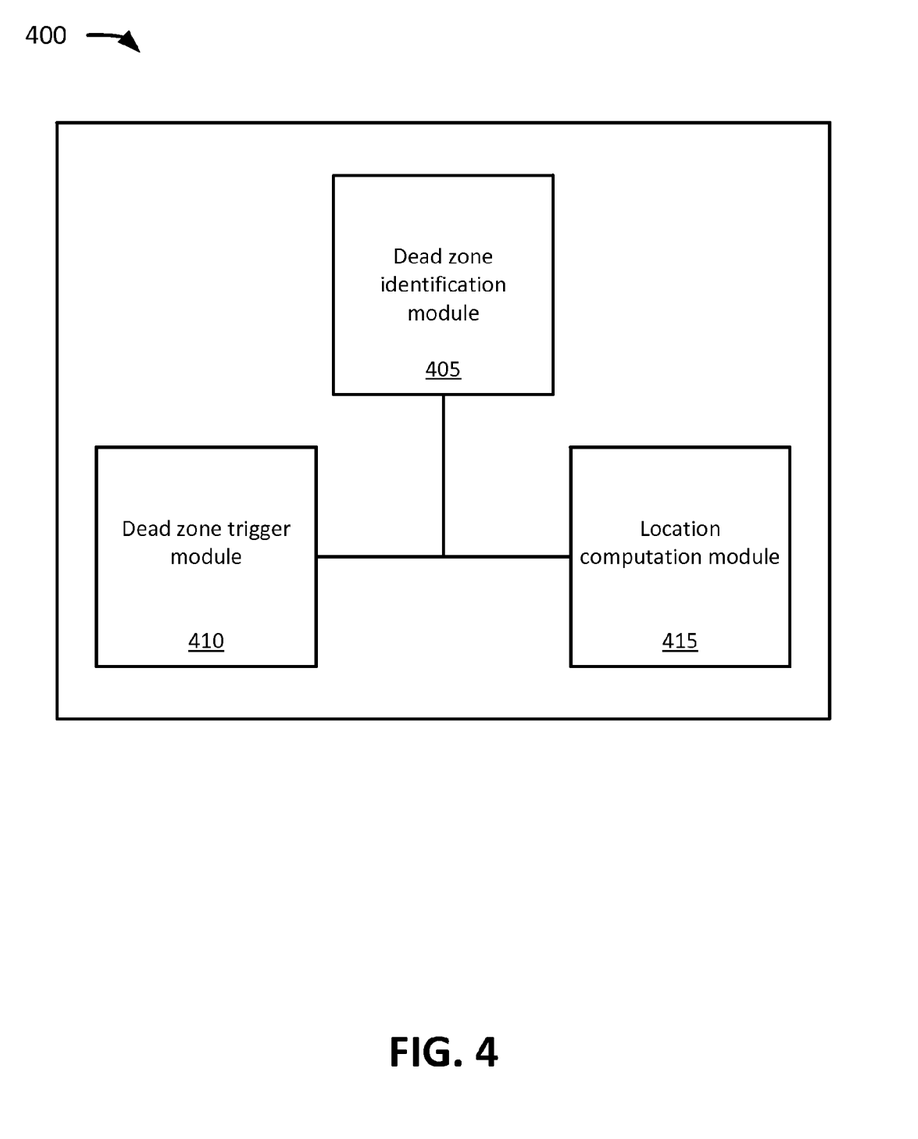
FIG. 4 illustrates example functional components of a dead zone location server, according to one or more implementations described herein.

FIG. 4 is a diagram of example functional components of system 400. In some implementations, system 400 may correspond to, for example, dead zone location server 115. In some implementations, system 400 may correspond to one or more other devices in addition to, or in lieu of, dead zone location server 115. As shown in FIG. 4, system 400 may include dead zone identification module 405, dead zone trigger module 410, and location computation module 415. Any, or all, of modules 405-415 may be implemented by or more memory devices (such as memory 330) and/or one or more processors (such as processor 320). Furthermore, multiple modules may be associated with the same memory device and/or processor (e.g., one memory device, or one set of memory devices, may store information associated with at least two different ones of modules 405-415).

Dead zone identification module 405 may receive and/or store information regarding location service dead zones. For example, dead zone identification module 405 may receive information regarding location service dead zones from one or more devices that identify location service dead zones, and/or from one or more users (e.g., a user of a particular user device 110, an administrator associated with system 400, etc.). Additionally, or alternatively, dead zone identification module 405 may identify location service dead zones based on receiving data associated with one or more user devices 110.

Figure 5:
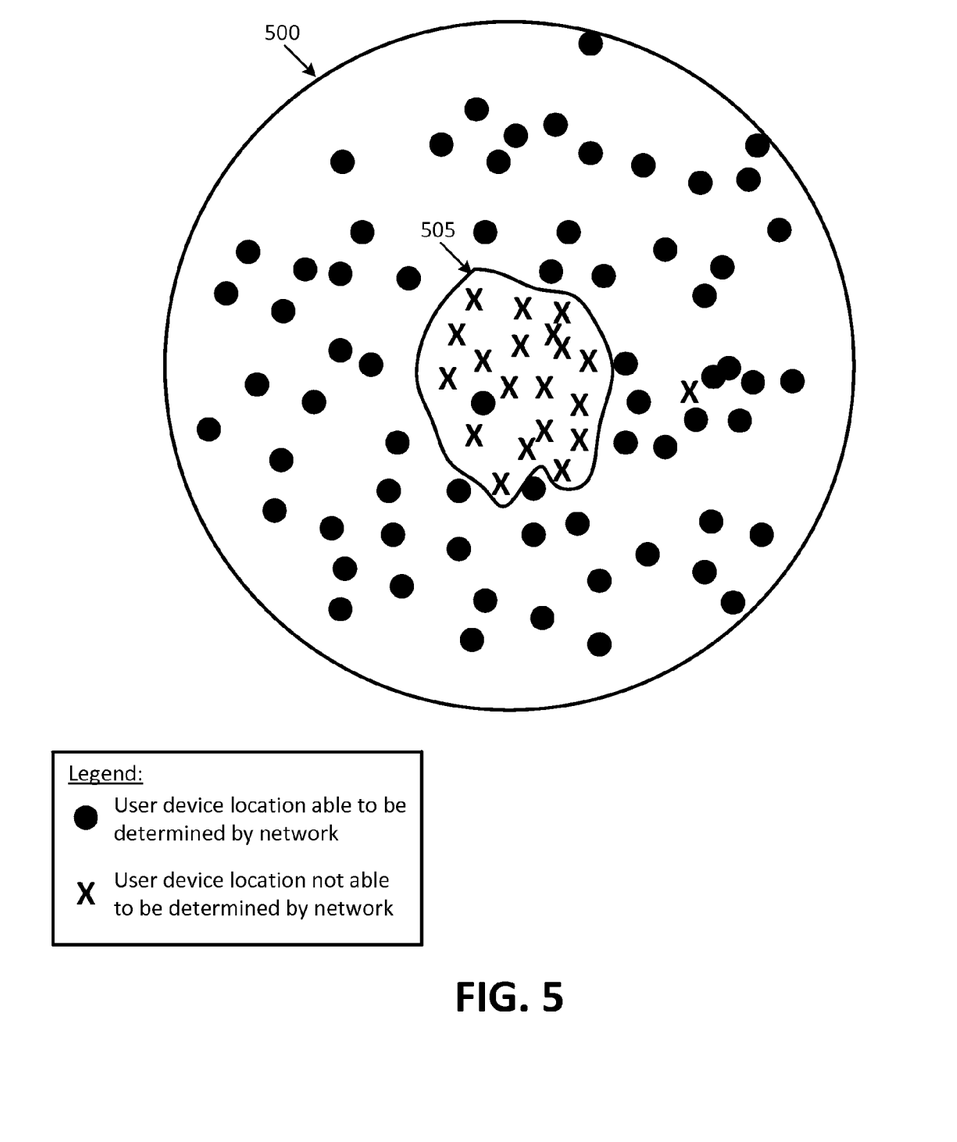
FIGS. 5-7 illustrate conceptual examples that illustrate functionality of a dead zone location server, according to one or more implementations described herein.
Figure 6:
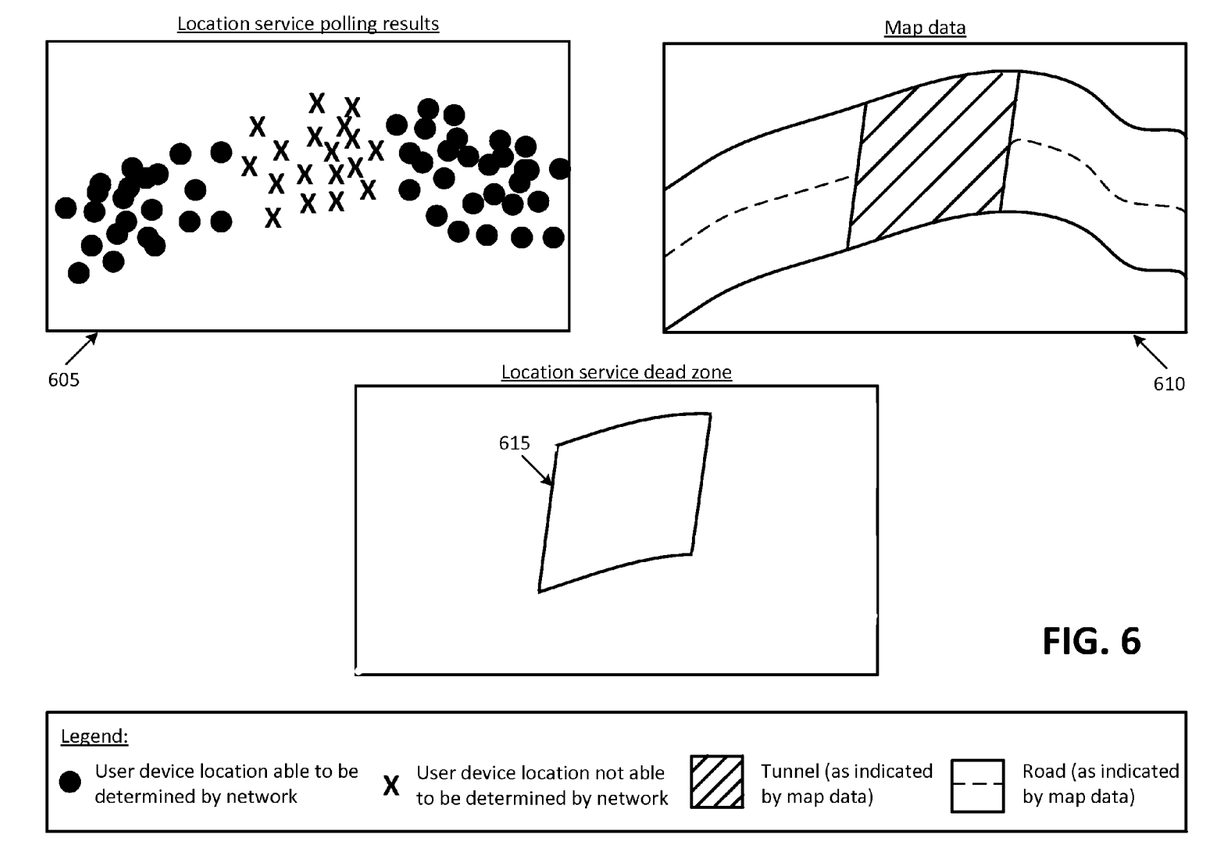

The data, based on which dead zone identification module 405 may identify one or more location service dead zones, may include data relating to locations at which network 105 is able to determine a location associated with one or more user devices, and/or locations at which network 105 is not able to determine a location associated with one or more user devices. FIGS. 5 and 6 conceptually illustrate examples of data associated with one or more user devices 110, based on which dead zone identification module 405 may identify one or more location service dead zones. For instance, FIG. 5 illustrates an example coverage area 500 associated with network 105.

Network 105 may attempt to identify locations associated with one or more user devices 110 using, for example, a triangulation technique. Network 105 may, for instance, periodically attempt to use a triangulation technique to identify a location associated with a particular user device 110 at a particular interval, such as every thirty seconds, every minute, every half hour, every hour, every two hours, or any other interval (a technique also referred to as polling). Additionally, or alternatively, network 105 may attempt to identify a location associated with a particular user device 110 in response to a request from the particular user device 110 for location information (e.g., a request associated with a map program and/or a navigation program of user device 110). Additionally, or alternatively, network 105 may attempt to identify a location associated with a particular user device 110 in response to determining that the particular user device 110 is "out of service" (e.g., not within range of one or more base stations associated with RAN 205).

For example, dead zone identification module 405 may store information regarding locations at which network 105 was able to determine the location of user devices 110 (e.g., via a triangulation technique), as shown in FIG. 5. In some implementations, dead zone identification module 405 may also, or alternatively, store information regarding locations at which network 105 was not able to determine the location of user devices 110 (e.g., via a triangulation technique). Based on the locations at which network 105 was able to determine the location of user devices 110 and/or the locations at which network 105 was not able to determine the location of user devices 110, dead zone identification module 405 may identify one or more location service dead zones, such as location service dead zone 505.

As shown in FIG. 5, the identified location service dead zone 505 may be associated with a relatively high concentration of locations at which network 105 was not able to determine the location of user devices 110 (e.g., a quantity of such locations that is at or above a threshold quantity, a ratio of such locations that is at or above a threshold ratio, or the like). As also shown in FIG. 5, location service dead zone 505 may include one or more locations at which network 105 was able to determine a location of one or more user devices 110. Such a scenario may occur, for example, when a particular user device 110 includes capabilities with which other user devices 110 may not be associated (e.g., a more powerful radio transceiver than radio transceivers associated with other user devices 110). On the other hand, as also shown by FIG. 5, locations within coverage area 505, at which network 105 was not able to determine a location of one or more user devices 110, may not be associated with a location service dead zone. Such a scenario may occur, for example, when a particular user device 110 does not include capabilities with which other user devices 110 may be associated (e.g., a less powerful radio transceiver than radio transceivers associated with other user devices 110), an occurrence of an error when determining the location of the particular user device 110, etc.

In some implementations, dead zone identification module 405 may additionally, or alternatively, identify location service dead zones based on information in addition to, or in lieu of, data associated with one or more user devices 110. For instance, as shown in FIG. 6, dead zone identification module 405 may identify a location service dead zone based on map data and/or data associated with one or more user devices 110. For instance, dead zone identification module 405 may receive information, conceptually represented as information 605 in FIG. 6, which may correspond to locations at which network 105 was able to determine locations of user devices 110 and/or at which network 105 was not able to determine locations of user devices 110. Based on this information, and as similarly described with respect to FIG. 5, dead zone identification module 405 may identify location service dead zone 615.

In some implementations, dead zone identification module 405 may receive information, conceptually represented as information 610, which may indicate one or more phenomena which may be typically associated with location service dead zones. Such phenomena may include, for example, one or more topographical features (e.g., mountainous terrain, forests, etc.), human-made structures (e.g., buildings, parking garages, tunnels, etc.), DASs, and/or one or more other phenomena that hinder or prevent determining a location of user devices 110 by network 105. For instance, information 610 may, in some implementations, correspond to map data, which may include information representing a roadway and a tunnel, as shown in FIG. 6. Dead zone identification module 405, according to some implementations, may identify location service dead zone 615 based on identifying that information 610 indicates the existence of a tunnel. In some such implementations, a size, shape, and/or location of location service dead zone 615 may be based on the particular phenomenon indicated by information 610. For instance, according to the example shown in FIG. 6, dead zone identification module 405 may store information indicating that the size, shape, and/or location of location service dead zone 615 is based on the size, shape, and/or location of the tunnel indicated by information 610 (e.g., the size, shape, and/or location of location service dead zone 615 exactly or approximately matches the size, shape, and/or location of the tunnel indicated by information).

In some implementations, dead zone identification module 405 may identify location service dead zone 615 based on a combination of information regarding user devices 110 and information indicating one or more phenomena which may be typically associated with location service dead zones. For instance, in some implementations, dead zone identification module 405 may identify a candidate location service dead zone based on information 605. In some such implementations, dead zone identification module 405 may identify information 610, which is associated with the same geographical region as information 605, in order to verify whether the candidate location service dead zone is associated with a phenomenon which may be typically associated with location service dead zones, and/or to determine a size, shape, and/or location of the candidate location service dead zone. In this sense, dead zone identification module 405, of some implementations, may identify location service dead zone 615 based on information 605 and information 610.

In some implementations, dead zone identification module 405 may store information regarding multiple sets of location service dead zones associated with multiple different sets of user devices 110. For instance, a first set of user devices 110 may be associated with high power radio transceivers, and may thus be associated with fewer, and/or different, location service dead zones than a second set of user devices 110. Dead zone identification module 405 may store information indicating with which location service dead zones (if any), this first set of user devices 110 is associated, and may further store information indicating with which location service dead zones, the second set of user devices 110 is associated. In some implementations, dead zone identification module 405 may store information indicating a particular set of location service dead zones for each different user device 110.

While some examples of identifying (and/or receiving information regarding) location service dead zones are described above (e.g., with respect to FIGS. 5 and 6), in practice, dead zone identification module 405 may identify location service dead zones using additional and/or different techniques than these examples described above. In some implementations, dead zone identification module 405 may store information regarding location service dead zones. Additionally, or alternatively, dead zone identification module 405 may, in some implementations, output information regarding identified location service dead zones to one or more other devices, such as one or more devices that implement a repository that stores information regarding location service dead zones.

Dead zone trigger module 410 may identify the occurrence of trigger events associated with location service dead zones (e.g., when user devices enter, are located near, and/or are located in location service dead zones). For instance, dead zone trigger module 410 may receive information indicating that a particular user device 110 is near a particular location service dead zone (e.g., within a particular distance of a particular location service dead zone identified by dead zone identification module 405, such as within 1 kilometer, within 100 meters, within 10 meters, etc.). This information may be received via a result of polling, and/or via one or more other techniques, as described above.

Additionally, or alternatively, dead zone trigger module 410 may compute, based on receiving information regarding multiple locations of a particular user device 110, at multiple different points in time, a velocity and/or a trajectory of the particular user device 110. For instance, dead zone trigger module 410 may identify a line or curve of best fit, associated with a trajectory of the particular user device 110. Based on this line or curve associated with the trajectory of the particular user device 110, and/or based on the velocity of the particular user device 110, dead zone trigger module 410 may identify whether the particular user device 110 is entering a particular location service dead zone, and/or when the particular user device 110 is within a particular distance of the particular location service dead zone (e.g., within 1 kilometer, within 100 meters, within 10 meters, etc.).

Dead zone trigger module 410 may store information identifying when user devices 110 enter, are located near, and/or are located in location service dead zones. Additionally, or alternatively, dead zone trigger module 410 may output this information to one or more other devices, and/or to location computation module 415.

Location computation module 415 may compute a location of a particular user device 110 that is located in a location service dead zone (e.g., a location service dead zone identified by dead zone identification module 405). In some implementations, location computation module 415 may compute the location of the particular user device 110 based on a velocity and/or trajectory of the particular user device 110 prior to entering the location service dead zone.

Figure 7:
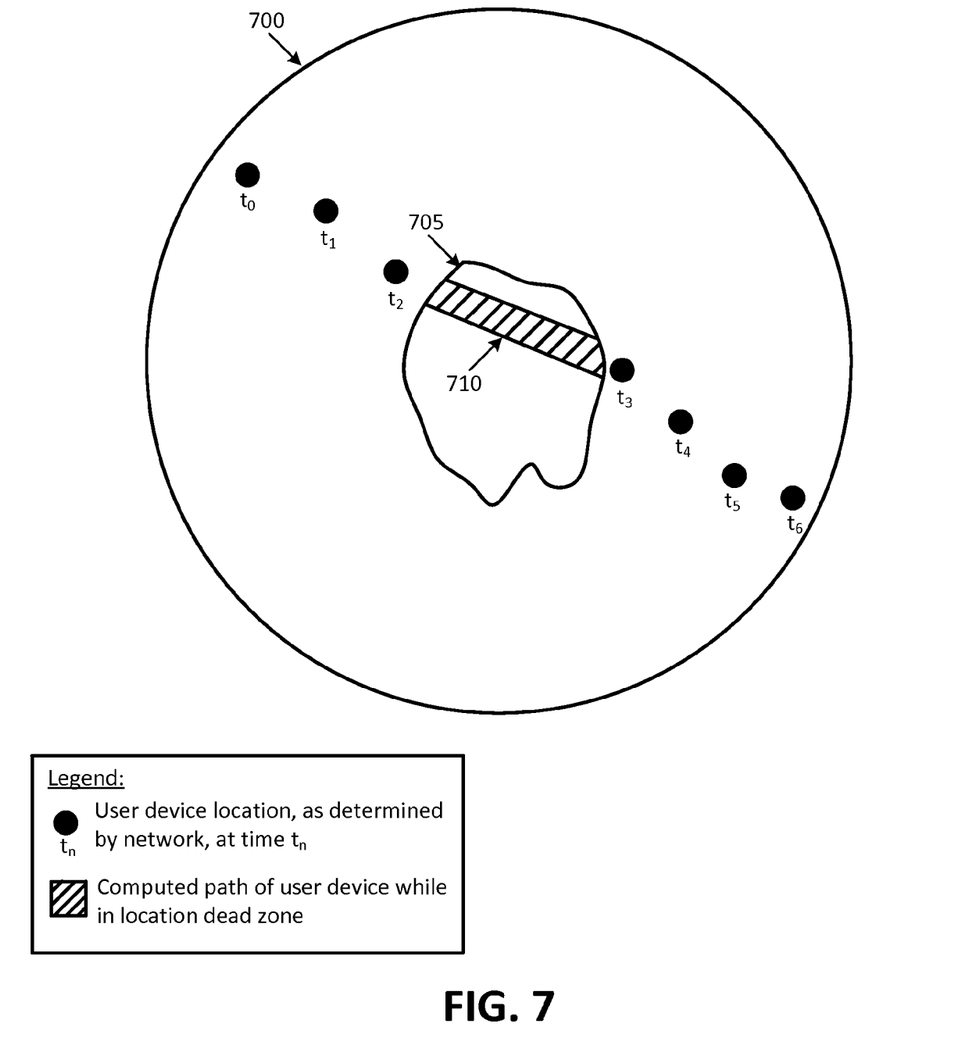

Additionally, or alternatively, location computation module 415 may compute the location of the particular user device 110 based on history data associated with the particular user device 110. For instance, as shown in FIG. 7, location computation module 415 may receive or store information, conceptually illustrated as information 700, indicating locations at which network 105 was able to determine the location of the particular user device 110, and times associated with these locations (i.e., time $t_0$ through time $t_6$, in this example). As shown in FIG. 7, location service dead zone 705 may correspond to a location service dead zone (e.g., a location service dead zone identified by dead zone identification module 405), in which network 105 was not able to determine a location associated with the particular user device 110.

Based on some or all of these locations (e.g., based on the locations at time $t_0$ through time $t_6$, the locations at time $t_1$ through time $t_5$, the locations at times $t_2$ and $t_3$, and/or any other combination of these locations), dead zone trigger module 410 may compute a path of the particular user device 110 when the particular user device 110 is located within location service dead zone 705. As shown in FIG. 7, path 710 may be associated with an area that is relatively small compared to the area of location service dead zone 705 (e.g., 50% of the area of location service dead zone 705, 10% of the area of location service dead zone 705, 1% of the area of location service dead zone 705, or some other percentage of the area of location service dead zone 705). Location computation module 415 may compute the path based on, for example, performing a linear interpolation operation based on two of the locations associated with time $t_0$ through time $t_6$, calculating a line of best fit based on three or more of the locations associated with time $t_0$ through time $t_6$, calculating a curve of best fit based on three or more of the locations associated with time $t_0$ through time $t_6$, and/or using any other computation that is based on the locations associated with time $t_0$ through time $t_6$. Thus, while path 710 is illustrated as a straight path, in some implementations, location computation module 415 may compute path 710 as a curved path.

In some implementations, location computation module 415 may analyze history data associated with the particular user device 110, when computing path 710 for the particular user device 110. In some implementation, location computation module 415 may analyze history data associated with one or more other user devices 110, when computing path 710 for the particular user device 110. For instance, referring back to the example shown in FIG. 6, location computation module 415 may compute a path based on multiple (e.g., dozens, hundreds, thousands, or more) user devices 110 traveling through location service dead zone 615, which may be associated with a tunnel. Location computation module 415 may, in some implementations, compute an average velocity and/or trajectory associated with user devices 110 that enter location service dead zone 615, based on data associated with the locations of these user devices 110 before and/or after they are located within location service dead zone 615.

Location computation module 415 may output information regarding a path and/or a particular location of a particular user device 110 at a given time to one or more devices, such as one or more devices associated with network 105. For example, referring back to the example shown at FIG. 7, assume that a particular user device 110 requests location information from network 105 between time $t_2$ and time $t_3$ (i.e., while the particular user device 110 is located within location service dead zone 705). Based on receiving this request, network 105 may determine whether user device 110 is located in or near a location service dead zone (e.g., a location service dead zone identified by dead zone identification module 405). In some implementations, this determination, may be based on information received from, and/or stored by, dead zone trigger module 410. That is, network 105 may determine whether the particular user device 110 is in location service dead zone 705 based on trigger information received from, and/or stored by, dead zone trigger module 410.

Additionally, or alternatively, based on receiving the request for location information from the particular user device 110, network 105 may attempt to identify (using, for instance, a triangulation technique) a location associated with the particular user device 110. Since the particular user device 110 is located within location service dead zone 705, network 105 may not be able to identify the location associated with the particular user device 110. Based on being unable to determine the location of the particular user device 110, network 105 may request and/or receive information from dead zone trigger module 410 indicating that the particular user device 110 is located within location service dead zone 705.

Based on identifying that the particular user device 110 is located within location service dead zone 705, location computation module 415 may identify a path associated with location service dead zone 705 (e.g., path 710). Based on the identified path 710 and a time associated with the request for location information (e.g., a time the request was sent and/or a time the request was received), location computation module 415 may compute a location, within location service dead zone 705, associated with the particular user device 110. Location computation module 415 may, in some implementations, output information identifying the computed location, within location service dead zone 705, associated with the particular user device 110, to network 105. Network 105 may, in some implementations, output the computed location information to the particular user device 110, which may use this information for any of a variety of purposes (e.g., as location assistance information for aGPS, as standalone location information, or the like).

Figure 8:
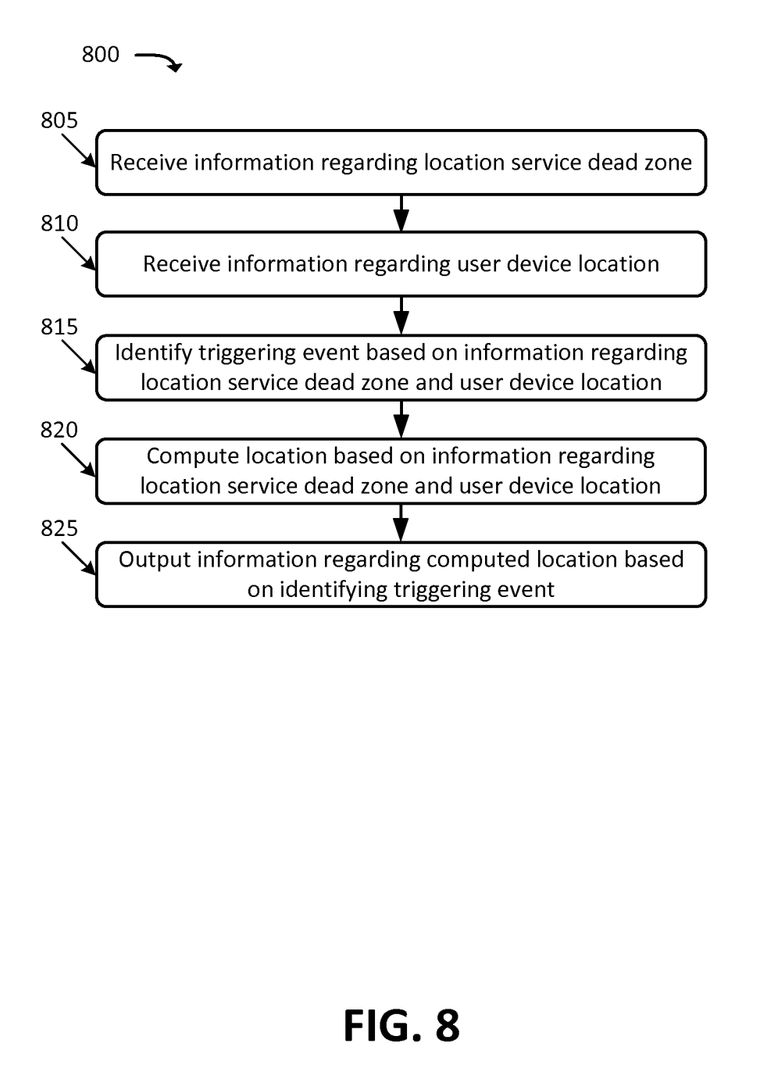
FIG. 8 illustrates an example process for handing over a connection based on received information regarding a user device, a network, network congestion, and/or an invoked application.

FIG. 8 shows an example process 800 for computing a location associated with a user device that is located in a location service dead zone. In one example implementation, process 800 may be performed by dead zone location server 115. In one implementation, process 800 may be performed by, for example, one or more of modules 405-415 described above with respect to FIG. 4. In another example implementation, some or all of process 800 may be performed by a device or collection of devices separate from, or in combination with, dead zone location server 115.

Process 800 may include receiving information regarding a location service dead zone (block 805). For example, as discussed above with respect to dead zone identification module 405, dead zone location server 115 may receive information regarding location service dead zones from one or more devices that identify location service dead zones, and/or from one or more users (e.g., a user of a particular user device 110, an administrator associated with system 400, etc.). Additionally, or alternatively, dead zone identification module 405 may identify location service dead zones based on receiving data associated with one or more user devices 110.

Process 800 may also include receiving information regarding a location of a user device (block 810). For example, as described above with respect to dead zone trigger module 410, dead zone location server 115 may receive (e.g., periodically receive) information regarding a location of a user device, such as user device 110. The information regarding the location of user device 110 may be received from a network, such as network 105, which may determine the location of user device 110 using one or more techniques, such as a triangulation technique. In some scenarios, receiving information regarding the location of user device 110 may include receiving an indication that network 105 was not able to determine a location of user device 110 (e.g., that network 105 was not able to determine the location of user device 110 using a triangulation technique). In some implementations, and as also described above, dead zone location server 115 may identify a velocity and/or trajectory of user device 110 based on the received information regarding the location of user device 110.

Process 800 may further include identifying a triggering event based on the information regarding the location service dead zone and the user device location (block 815). For example, as described above with respect to dead zone trigger module 410, dead zone location server 115 may identify, based on the user device location information received at block 810, that user device 110 is in or near (i.e., within a particular distance of) a location service dead zone (e.g., a location service dead zone associated with the information received at block 805). In some implementations, dead zone location server 115 may identify that a triggering event has occurred when user device 110 is in or near a location service dead zone.

For instance, assume that dead zone location server 115 receives information indicating that, at a given time, network 105 was unable to determine a location of user device 110. Further assume that dead zone location server 115 identifies that a trajectory of user device 110 indicates that user device 110 was moving toward a particular location service dead zone before network 105 was unable to determine the location of user device 110. In this situation, dead zone location server 115 may identify that a triggering event has occurred, as it is likely that user device 110 is located within the particular location service dead zone at the given time.

Process 800 may additionally include computing a location of the user device based on the information regarding the location service dead zone and the user device location (block 820). For example, as discussed above with respect to location computation module 415, dead zone location server 115 may compute a location of user device 110 based on one or more factors. These factors may include, for example, a velocity and/or trajectory of user device 110 before user device 110 entered the location service dead zone, history data associated with user device 110, and/or history data associated with multiple user devices. In some implementations, dead zone location server 115 may compute the location of user device 110 based on one or more of these various factors, in addition to a particular time (e.g., a time at which a location of user device 110 was requested by network 105, user device 110, and/or by some other device).

Process 800 may also include outputting information regarding the calculated location (block 825). For example, dead zone location server 115 may output the information identifying the location of user device 110 within the location service dead zone, computed at block 820, to network 105. Additionally, or alternatively, dead zone location server 115 may output the information identifying the location of user device 110 to one or more other devices, and/or may store the information identifying the location of user device 110.

The device(s) and processes described may compute a location of a user device when the user device is in a location service dead zone. In some implementations, the system may store information identifying one or more location service dead zones. The system of some implementations may automatically identify one or more location service dead zones based on activity of one or more user devices. Additionally, or alternatively, the system of some implementations may receive such information from one or more sources. The system of some implementations may detect that the user device has entered a location service dead zone based on, for example, a location of the user device and/or a velocity of the user device. As additionally described above, the system of some implementations may compute, at a given time while the user device is located in a location service dead zone, a location (e.g., a probable and/or approximate location) of the user device.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 8, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
receiving, by one or more processors of one or more server devices, first information regarding a location service dead zone;
receiving, by one or more processors of the one or more server devices, second information regarding a location of a user device;
identifying, based on the first information and the second information and by one or more processors of the one or more server devices, that the user device is within the location service dead zone at a particular time,
where the second information regarding the location of the user device includes information regarding at least one of:
a velocity of the user device prior to the particular time, or
a trajectory of the user device prior to the particular time;
computing, by one or more processors of the one or more server devices, a location of the user device, within the location service dead zone, at the particular time, the computing being based on at least one of:
the second information regarding the location of the user device,
history data associated with the user device, or
history data associated with one or more other user devices; and
storing or outputting, by one or more processors of the one or more server devices, information regarding the computed location of the user device at the particular time.

2. The method of claim 1, where the location service dead zone corresponds to an area in which a cellular telecommunications network is not able to determine a location of the user device.

3. The method of claim 2, where the area, in which the telecommunications network is not able to determine a location of the user device, corresponds to an area in which the user device communicates with the cellular telecommunications network via a distributed antenna system.

4. The method of claim 1, where the location service dead zone corresponds to an area in which a cellular telecommunications network is not able to determine a location of a user device via a cellular tower triangulation technique.

5. The method of claim 1, where computing the location of the user device, within the location service dead zone, includes performing a linear interpolation calculation based on at least one of:
the second information regarding the location of the user device,
the history data associated with the user device, or
the history data associated with one or more other user devices.

6. The method of claim 1, where the history data associated with the one or more other user devices includes information regarding at least one of:

a velocity of the one or more other user devices when the one or more other user devices were within a particular distance of the location service dead zone, a trajectory of the one or more other user devices when the one or more other user devices were within a particular distance of the location service dead zone, or a position of the one or more other user devices when the one or more other user devices were within a particular distance of the location service dead zone.

7. A system, comprising:

one or more devices to:

receive first information regarding a location service dead zone;

receive second information regarding a location of a user device;

identify, based on the first information and the second information, that the user device is within the location service dead zone at a particular time where the second information regarding the location of the user device includes information regarding at least one of:

a velocity of the user device prior to the particular time, or a trajectory of the user device prior to the particular time;

compute a location of the user device, within the location service dead zone, at the particular time, based on at least one of:

the second information regarding the location of the user device, history data associated with the user device, or history data associated with one or more other user devices; and store or output information regarding the computed location of the user device at the particular time.

8. The system of claim 7, where the location service dead zone corresponds to an area in which a telecommunications network is not able to determine a location of the user device.

9. The system of claim 8, where the area, in which the telecommunications network is not able to determine a location of the user device, corresponds to an area in which the user device communicates with the telecommunications network via a distributed antenna system.

10. The system of claim 7, where the location service dead zone corresponds to an area in which a cellular telecommunications network is not able to determine a location of a user device via a cellular tower triangulation technique.

11. The system of claim 7, where when computing the location of the user device, within the location service dead zone, the one or more devices are to perform a linear interpolation calculation based on at least one of:

the second information regarding the location of the user device, the history data associated with the user device, or the history data associated with one or more other user devices.

12. The system of claim 7, where the history data associated with the one or more other user devices includes information regarding at least one of:

a velocity of the one or more other user devices when the one or more other user devices were within a particular distance of the location service dead zone, a trajectory of the one or more other user devices when the one or more other user devices were within a particular distance of the location service dead zone, or a position of the one or more other user devices when the one or more other user devices were within a particular distance of the location service dead zone.

13. A computer-readable medium, comprising:

a plurality of computer-executable instructions, which, when executed by one or more processors, cause the one or more processors to:

receive first information regarding a location service dead zone;

receive second information regarding a location of a user device;

identify, based on the first information and the second information, that the user device is within the location service dead zone at a particular time where the second information regarding the location of the user device includes information regarding at least one of:

a velocity of the user device prior to the particular time, or a trajectory of the user device prior to the particular time;

compute a location of the user device, within the location service dead zone, at the particular time, the computing being based on:

the second information regarding the location of the user device, and at least one of:

history data associated with the user device, or history data associated with one or more other user devices; and store or output information regarding the computed location of the user device at the particular time.

14. The computer-readable medium of claim 13, where the location service dead zone corresponds to an area in which a telecommunications network is not able to determine a location of the user device.

15. The computer-readable medium of claim 13, where the location service dead zone corresponds to an area in which a cellular telecommunications network is not able to determine a location of a user device via a cellular tower triangulation technique.

16. The computer-readable medium of claim 13, where the plurality of computer-executable instructions, which cause the one or more processors to compute the location of the user device, within the location service dead zone, cause the one or more processors to perform a linear interpolation calculation based on at least one of:

the second information regarding the location of the user device, the history data associated with the user device, or the history data associated with one or more other user devices.

17. The computer-readable medium of claim 13, where the history data associated with the one or more other user devices includes information regarding at least one of:

a velocity of the one or more other user devices when the one or more other user devices were within a particular distance of the location service dead zone, a trajectory of the one or more other user devices when the one or more other user devices were within a particular distance of the location service dead zone, or a position of the one or more other user devices when the one or more other user devices were within a particular distance of the location service dead zone.

18. The computer-readable medium of claim 14, where the area, in which the telecommunications network is not able to determine a location of the user device, corresponds to an area in which the user device communicates with the cellular telecommunications network via a distributed antenna system.

\* \* \* \* \*